US012764264B2

(12) United States Patent
Furukawa

(10) Patent No.: US 12,764,264 B2
(45) Date of Patent: Oct. 13, 2026

(54) IMAGE PROCESSING APPARATUS, CONTROL METHOD AND STORAGE MEDIUM

(71) Applicant: CANON KABUSHIKI KAISHA, Tokyo (JP)

(72) Inventor: Takeshi Furukawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 370 days.

(21) Appl. No.: 18/189,256

(22) Filed: Mar. 24, 2023

(65) Prior Publication Data

US 2023/0328214 A1 Oct. 12, 2023

(30) Foreign Application Priority Data

Mar. 31, 2022 (JP) ................................ 2022-060795
Nov. 15, 2022 (JP) ................................ 2022-182797

(51) Int. Cl.
*H04N 13/117* (2018.01)
*G06F 3/14* (2006.01)
(Continued)

(52) U.S. Cl.
CPC ............ *H04N 13/117* (2018.05); *G06F 3/14* (2013.01); *G06T 7/70* (2017.01); *G06V 10/761* (2022.01); *H04N 21/812* (2013.01)

(58) Field of Classification Search
CPC .... H04N 13/117; H04N 21/812; H04N 23/60; H04N 23/90; H04N 5/2723;
(Continued)

(56) References Cited

U.S. PATENT DOCUMENTS 8,549,556 B2 * 10/2013 Rakib .................... G06V 20/48 725/35
2010/0070996 A1 * 3/2010 Liao ................ H04N 21/45452 725/35

(Continued)

FOREIGN PATENT DOCUMENTS

JP 2012-048639 A 3/2012
JP 2018142164 A 9/2018

(Continued)

OTHER PUBLICATIONS

Extended European Search Report issued in corresponding EP Patent Application No. 23163041.9, dated Aug. 2, 2023.

(Continued)

*Primary Examiner* — John Villecco
*Assistant Examiner* — Kyla Guan-Ping Tiao Allen
(74) *Attorney, Agent, or Firm* — Carter, DeLuca & Farrell LLP

(57) ABSTRACT

An image processing apparatus displays a virtual viewpoint video generated using a plurality of video data generated by a plurality of image capture apparatuses and first video data that is stored in a storage medium and different from the plurality of video data, identifies a position of an object relating to the first video data in the plurality of video data, generates second video data which is a virtual viewpoint video, on the basis of the identified position of the object, and controls to display the first video data following a display of the second video data.

14 Claims, 12 Drawing Sheets

(51) Int. Cl.

| | |
|---|---|
| ***G06T 7/70*** | (2017.01) |
| ***G06V 10/74*** | (2022.01) |
| ***H04N 5/272*** | (2006.01) |
| ***H04N 21/218*** | (2011.01) |
| ***H04N 21/431*** | (2011.01) |
| ***H04N 21/81*** | (2011.01) |
| ***H04N 23/60*** | (2023.01) |
| ***H04N 23/695*** | (2023.01) |
| ***H04N 23/90*** | (2023.01) |

(58) Field of Classification Search

CPC ....... H04N 21/23412; H04N 21/23424; H04N 21/4316; H04N 23/695; H04N 21/21805; G06F 3/14; G06T 7/70; G06T 15/20; G06V 10/761

See application file for complete search history.

(56) References Cited

U.S. PATENT DOCUMENTS

| | | | | |
|---|---|---|---|---|
| 2013/0223537 | A1 * | 8/2013 | Kasai | H04N 21/4728 375/240.24 |
| 2018/0288394 | A1 | 10/2018 | Aizawa | |
| 2019/0199997 | A1 * | 6/2019 | Mizuno | G06T 7/70 |
| 2020/0021752 | A1 * | 1/2020 | Holzer | G06V 10/34 |
| 2020/0106968 | A1 * | 4/2020 | Shuden | G06T 7/292 |
| 2020/0154157 | A1 * | 5/2020 | Smith | H04N 21/812 |
| 2021/0236920 | A1 | 8/2021 | Zalewski | |
| 2022/0156798 | A1 * | 5/2022 | Wu | G06V 10/751 |
| 2022/0159316 | A1 * | 5/2022 | Katsumata | H04N 21/84 |
| 2023/0009185 | A1 | 1/2023 | Furukawa | |
| 2023/0396749 | A1 * | 12/2023 | Miyata | G06T 19/003 |

FOREIGN PATENT DOCUMENTS

| | | | | | |
|---|---|---|---|---|---|
| KR | 101254292 | B1 * | 4/2013 | | G09G 5/003 |
| WO | 2001/082195 | A1 | 11/2001 | | |
| WO | 2019021375 | A | 1/2019 | | |
| WO | WO-2019171128 | A1 * | 9/2019 | | H04L 67/53 |

OTHER PUBLICATIONS

Office Action issued by the European Patent Office on Oct. 13, 2025 in corresponding EP Patent Application No. 23163041.9.

Notice of Reasons for Refusal issued by the Japanese Patent Office on Aug. 10, 2026 in corresponding JP Patent Application No. 2022-182797, with English translation.

* cited by examiner

FIG. 6A

| REFERENCE CAMERA PATH INFORMATION | | |
|---|---|---|
| TIME | COORDINATE (X,Y,Z) | ORIENTATION (pan,tilt,roll) |
| T1 | (0,-5000,1000) | (0,45,0) |
| T2 | (3500,-3500,1000) | (45,45,0) |
| T3 | (5000,0,1000) | (90,45,0) |
| T4 | (3500,3500,1000) | (135,45,0) |
| T5 | (0,5000,1000) | (180,45,0) |
| T6 | (-3500,3500,1000) | (225,45,0) |
| T7 | (-5000,0,1000) | (270,45,0) |
| T8 | (-3500,-3500,1000) | (315,45,0) |
| T9 | (-2000,-2000,1000) | (315,45,0) |

FIG. 6B

| INTRODUCTION CAMERA PATH INFORMATION | | |
|---|---|---|
| TIME | COORDINATE (X,Y,Z) | ORIENTATION (pan,tilt,roll) |
| T1 | (50000,10000,1000) | (0,45,0) |
| T2 | (53500,11500,1000) | (45,45,0) |
| T3 | (55000,15000,1000) | (90,45,0) |
| T4 | (53500,18500,1000) | (135,45,0) |
| T5 | (50000,20000,1000) | (180,45,0) |
| T6 | (46500,18500,1000) | (225,45,0) |
| T7 | (45000,15000,1000) | (270,45,0) |
| T8 | (46500,11500,1000) | (315,45,0) |
| T9 | (48000,12000,1000) | (315,45,0) |

IMAGE PROCESSING APPARATUS, CONTROL METHOD AND STORAGE MEDIUM

BACKGROUND OF THE INVENTION

Field of the Invention

The present disclosure relates to a technique for generating a virtual viewpoint video corresponding to a predetermined virtual viewpoint using video captured by a plurality of image capture apparatuses.

Description of the Related Art

A known technique for generating a video (virtual viewpoint video) of a subject captured as if from a virtually set viewpoint (virtual viewpoint) uses video obtained by capturing the subject at a plurality of positions and angles. With such a virtual viewpoint video, since a video from a discretionary position and angle can be generated, in the broadcast of a game of sports, such as soccer, basketball, and the like, the users, that is the viewers, can be given a more real experience compared to when a normal video of a sports game is used.

However, when broadcasting sports games or the like, spots for presenting advertisements from sponsor companies or the like are provided, and pre-configured advertisement videos or the like are presented to the viewers. In Japanese Patent Laid-Open No. 2012-048639, a method is described for inserting an advertisement onto a curved surface with a predetermined orientation with respect to the direction of the virtual viewpoint in the virtual viewpoint video.

However, when viewing the virtual viewpoint videos, the viewer tends to concentrate on the players playing the sport or the ball, which is the main content. Thus, an advertisement display method such as that in Japanese Patent Laid-Open No. 2012-048639 tends to be unable to guide the line-of-sight of the viewer to an advertisement, meaning that the desired advertisement effect may not be obtained. In particular, advertisements for products with little relation to the main content tend not to grasp the interest or attention of the viewer. Thus, switching to another video such as an advertisement video while a virtual viewpoint video is being displayed may not give the desired effect.

SUMMARY OF THE INVENTION

The present invention in its first aspect provides an image processing apparatus comprising: one or more memories storing instructions; and one or more processors executing the instructions to: display a virtual viewpoint video generated using a plurality of video data generated by a plurality of image capture apparatuses and first video data that is stored in a storage medium and different from the plurality of video data; identify a position of an object relating to the first video data in the plurality of video data; generate second video data which is a virtual viewpoint video, on the basis of the identified position of the object; and control to display the first video data following a display of the second video data.

The present invention in its second aspect provides a control method for an image processing apparatus comprising: displaying a virtual viewpoint video generated using a plurality of video data generated by a plurality of image capture apparatuses and first video data that is stored in a storage medium and different from the plurality of video data; identifying a position of an object relating to the first video data in the plurality of video data; generating second video data which is a virtual viewpoint video on the basis of the identified position of the object; and controlling to display the first video data following a display of the second video data.

The present invention in its third aspect provides a computer-readable storage medium storing a program configured to cause a computer to function as the image processing apparatus of the first aspect.

Further features of the present disclosure will become apparent from the following description of exemplary embodiments (with reference to the attached drawings).

BRIEF DESCRIPTION OF THE DRAWINGS

FIGS. 6A and 6B are diagrams illustrating examples of reference camera path information and introduction camera path information according to the embodiments of the present disclosure and the modifications.

DESCRIPTION OF THE EMBODIMENTS

Figure 1:
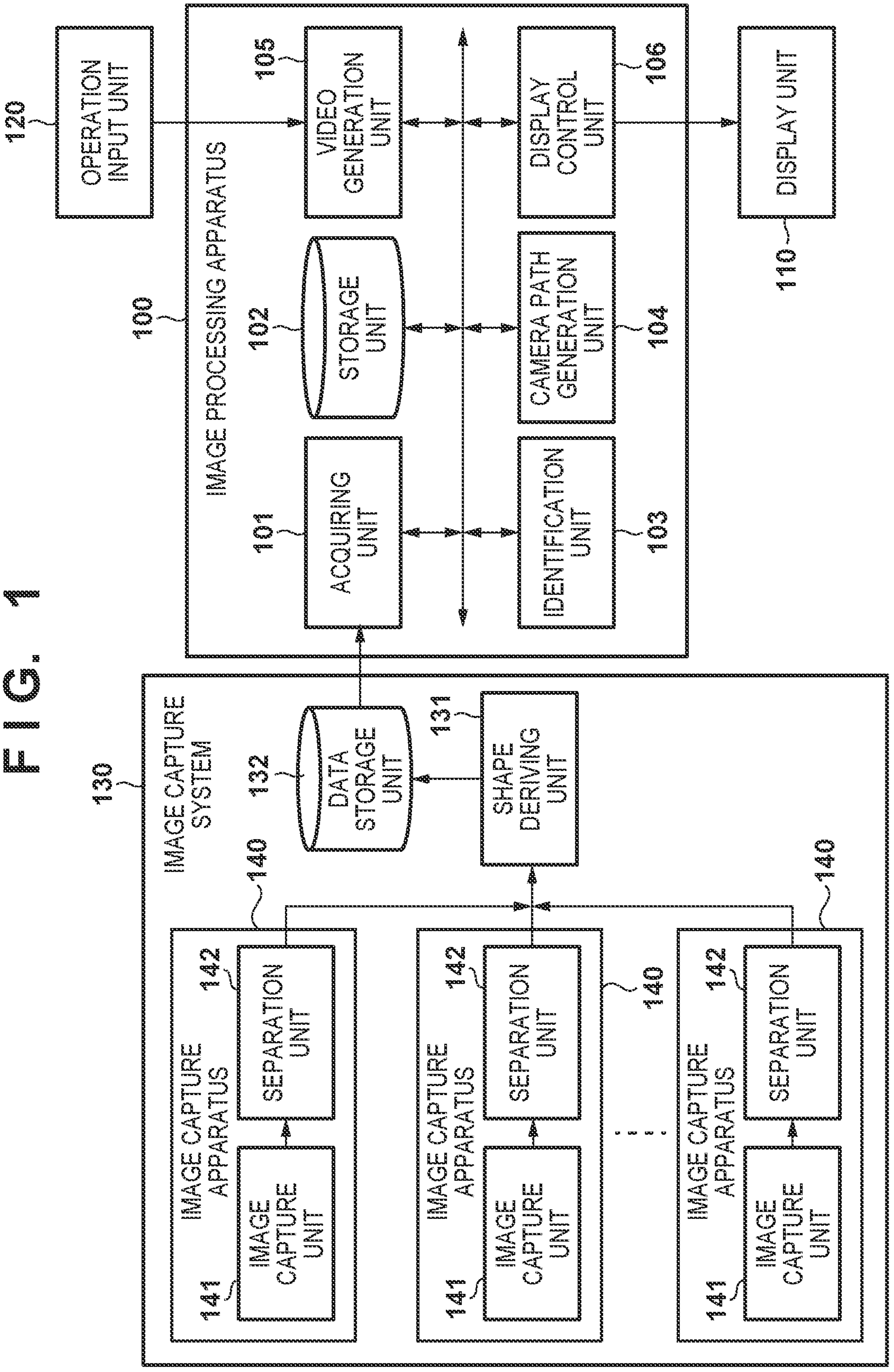
FIG. 1 is a block diagram illustrating the functional configuration of an image processing system according to embodiments of the present disclosure and modifications.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The embodiment described below is an example of the present disclosure applied to an image processing apparatus, as an example of an image processing apparatus, that can generate a virtual viewpoint video corresponding to a discretionary virtual viewpoint using a video generated by a plurality of image capture apparatuses. Also, in the present specification, “virtual viewpoint video” refers to a video from a virtual viewpoint independent of the viewpoints of a video generated by the plurality of image capture apparatuses. Note that the plurality of image capture apparatuses include at least two image capture apparatuses arranged in a manner so that a common subject can be captured in a predetermined region.

Functional Configuration of Image Processing System

FIG. 1 is a block diagram illustrating the functional configuration of the entire image processing system including an image processing apparatus 100 according to the present embodiment. As illustrated, the image processing system includes an image capture system 130 that captures video used in generating a virtual viewpoint video and the image processing apparatus 100 that presents the virtual viewpoint video to a viewer.

The image capture system 130 is a system that captures video used in generating a virtual viewpoint video. The image capture system 130 includes a plurality of image capture apparatuses 140. The image capture apparatuses 140 are installed on the periphery of a field where a sports game is being held, for example, surrounding the field. The image capture apparatuses 140 each capture, in particular, on-field images and output video data. In the example described below, the sports scene captured by the image capture system 130 is a soccer game. Accordingly, in the present embodiment, the image capture apparatuses 140 are arranged at various different places on the periphery of the soccer field and are adjusted in terms of the image capture direction and field of view to mainly show the field within the image capture area. Also, in the present embodiment, the viewer views the soccer game held on the field via virtual viewpoint videos from a desired virtual viewpoint.

The image capture apparatuses 140 each include an image capture unit 141 and a separation unit 142. The image capture unit 141 is a digital video camera provided with a video signal interface, a representative example being Serial Digital Interface (SDI). The image capture unit 141 outputs the video data generated via image capture to the separation unit 142. Hereinafter, the video data generated by the image capture unit 141 may be referred to as a video signal, video data, or simply as video.

The separation unit 142 generates a silhouette image from the video data input from the image capture unit 141. In the present embodiment, for example, the separation unit 142 uses a method such as the background subtraction method or the like to separate a background region included in the input video and regions other than the background and generate a silhouette image illustrating the external shape of the subject. The regions other than the background correspond to subjects (a player, soccer ball, drink bottle, and the like). The silhouette image is a binary image that illustrates whether each pixel is a subject region or a background region. In the present embodiment, the silhouette image corresponds to image data including data illustrating the region inside the outline of the external shape of the subject as black and data illustrating the outside region as white. In other words, the silhouette image is data illustrating a distribution of pixels or regions of a subject image in a frame corresponding to video. Also, by extracting an image of a region of a subject in the input video, texture data, which is video data corresponding to the silhouette image, can be obtained by the separation unit 142. The separation unit 142 outputs the silhouette image and the texture data to a shape deriving unit 131.

The shape deriving unit 131 of the image capture system 130 derives the three-dimensional shape of a subject on the basis of the silhouette image output from the separation unit 142 of each image capture apparatus 140. In the present embodiment, the visual volume intersection method is used to derive the three-dimensional shape, for example. When using the visual volume intersection method, the shape deriving unit 131 performs inverse projection to map the silhouette image in a three-dimensional shape on the basis of the positions and image capture directions of the image capture apparatuses 140 and derives the shape of the subject on the basis of the intersection portions of the visual volumes. In the present embodiment, the three-dimensional shape derived by the shape deriving unit 131 is derived as a voxel group configured of units of voxels of a predetermined size, for example. Also, at this time, the shape deriving unit 131 also derives the three-dimensional position information (position information) of the subject.

Figure 2:
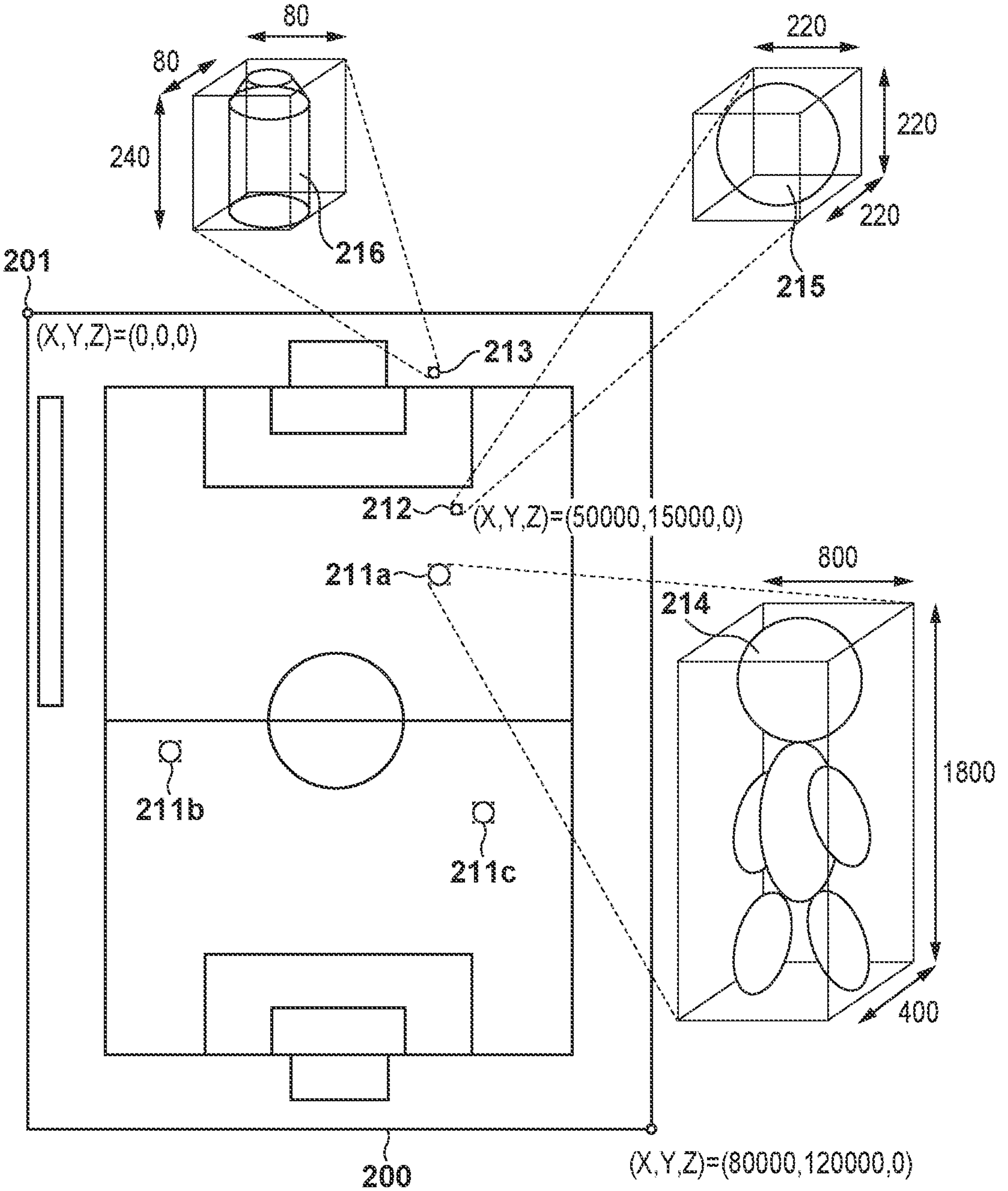
FIG. 2 is a diagram illustrating an example of three-dimensional space and the distribution of subjects corresponding to content being displayed according to the embodiments of the present disclosure.

For example, as illustrated in FIG. 2, when players 211*a* to 211*c*, a ball 212, and a drink bottle 213, which are subjects, are distributed on a field 200, the shape deriving unit 131 derives the three-dimensional position and three-dimensional shape of each. In this example, as illustrated in FIG. 2, one corner (top left corner in the diagram) of the field 200 is set as an origin point 201 for the three-dimensional space. The three-dimensional position of each subject is derived using the origin point 201 as the reference. Also, for each subject, by merging the information of the silhouette images associated with the image capture apparatuses 140, the shape deriving unit 131 identifies the voxels arranged in the direction of the three axes (x axis, y axis, and z axis) and derives the three-dimensional shape. In the present embodiment, in the three-dimensional space used in generating a virtual viewpoint video, one voxel has a size corresponding to an actual size of 1 mm×1 mm×1 mm (1 cubic millimeter). For example, the ball 212, which has a diameter of 22 cm, is derived as a voxel group 215 with a shape (spherical shape) that fits in a bounding box measuring 220×220×220. In a similar manner, the player 211 is derived as a voxel group 214 with a shape that fits in a bounding box measuring 800×400×1800, for example. Also, the drink bottle 213 is derived as a voxel group 216 with a shape that fits in a bounding box measuring 80×80×240. The position information of the subjects may be derived via a discretionary method using the barycentric coordinates of the eight vertices that define the bounding box of the shape information corresponding to the subject, using the coordinates of one of the vertices, or the like. Hereinafter, the position information of the subject is described using the absolute coordinates of the vertex closest to the origin point, from among the eight vertices that define the corresponding bounding box.

A data storage unit 132 stores the texture data output from the image capture apparatuses 140, information (shape information) of the three-dimensional shape of the subject derived by the shape deriving unit 131, and information of the three-dimensional position of the subject. The information stored in the data storage unit 132 is used by the image processing apparatus 100 to generate a virtual viewpoint video. Also, the data storage unit 132 may store video data generated by the image capture apparatuses 140.

The image processing apparatus 100 generates a virtual viewpoint video relating to the captured subject on the basis of the various types of information stored in the data storage unit 132 of the image capture system 130. The virtual viewpoint video is generated on the basis of the shape information and the position information acquired from the image capture system 130. In the present embodiment, the virtual viewpoint video generated by the image processing apparatus 100 is video that can be a viewing experience from a discretionary virtual viewpoint from in the soccer stadium.

The virtual viewpoint viewed by the viewer is set on the basis of a control signal input to a video generation unit 105 from an operation input unit 120. The operation input unit 120 is an input apparatus constituted of a lever and a switch, for example. The operation input unit 120 receives operations for setting the virtual viewpoint to point in a discretionary direction at a discretionary position in the three-dimensional space of the virtual viewpoint video.

An acquiring unit 101 acquires various types of information (shape information, position information, texture data, and the like) required for generating the virtual viewpoint video from the data storage unit 132. The various types of acquired information is transmitted to an identification unit 103 described below and the video generation unit 105.

A storage unit 102 stores advertisement videos, object information, and reference camera path information. Object information is, for example, information of the three-dimensional shape of an object relating to a product to be advertised. Reference camera path information is data relating to a transition (camera path) of a default virtual viewpoint in an introduction video described below. Hereinafter, an object, such as a product, to be advertised via an advertisement video may also be referred to as an advertisement object. In the present embodiment, the object information is, for example, information of the three-dimensional shape of the soccer ball. Note that since the subject is identified using the object information, the object information is preferably in the same file format as the shape information derived by the shape deriving unit 131.

The identification unit 103 identifies the subject (hereinafter, also referred to as the target object) corresponding to the advertisement object from among the subjects captured by the image capture system 130. The identification unit 103 outputs the position information of the target object acquired from the acquiring unit 101 to a camera path generation unit 104.

The camera path generation unit 104 generates introduction camera path information used to generate the introduction video switched to from the virtual viewpoint video currently viewed on the basis of the position information of the target object identified by the identification unit 103. The introduction video is a virtual viewpoint video displayed before the advertisement video is displayed and is generated using video captured by the image capture apparatuses 140. Introduction camera path information is data for defining a transition (including at least movement or a change in direction) of the virtual viewpoint relating to the introduction video. This will be described below in detail.

The video generation unit 105 generates the virtual viewpoint video using the various types of information acquired by the acquiring unit 101. The video generation unit 105 executes rendering processing on the basis of the shape information and the position information relating to the subject and generates the virtual viewpoint video. The virtual viewpoint is determined on the basis of an operation by the viewer via the operation input unit 120 or the introduction camera path information input from the camera path generation unit 104.

A display control unit 106 controls the display of video to a display unit 110. The display unit 110 is a liquid crystal display, an organic EL display, or a similar display apparatus, for example. In the image processing system according to the present embodiment, an advertisement video or the virtual viewpoint video generated by the video generation unit 105 are displayed on the display unit 110. Specifically, the display control unit 106 mainly displays the virtual viewpoint video relating to the virtual viewpoint set by the viewer. Also, when an advertisement video is displayed, the display control unit 106 performs control so that the introduction video and the advertisement video are continuously displayed on the display unit 110.

Hardware Configuration of Image Processing Apparatus 100

Figure 3:
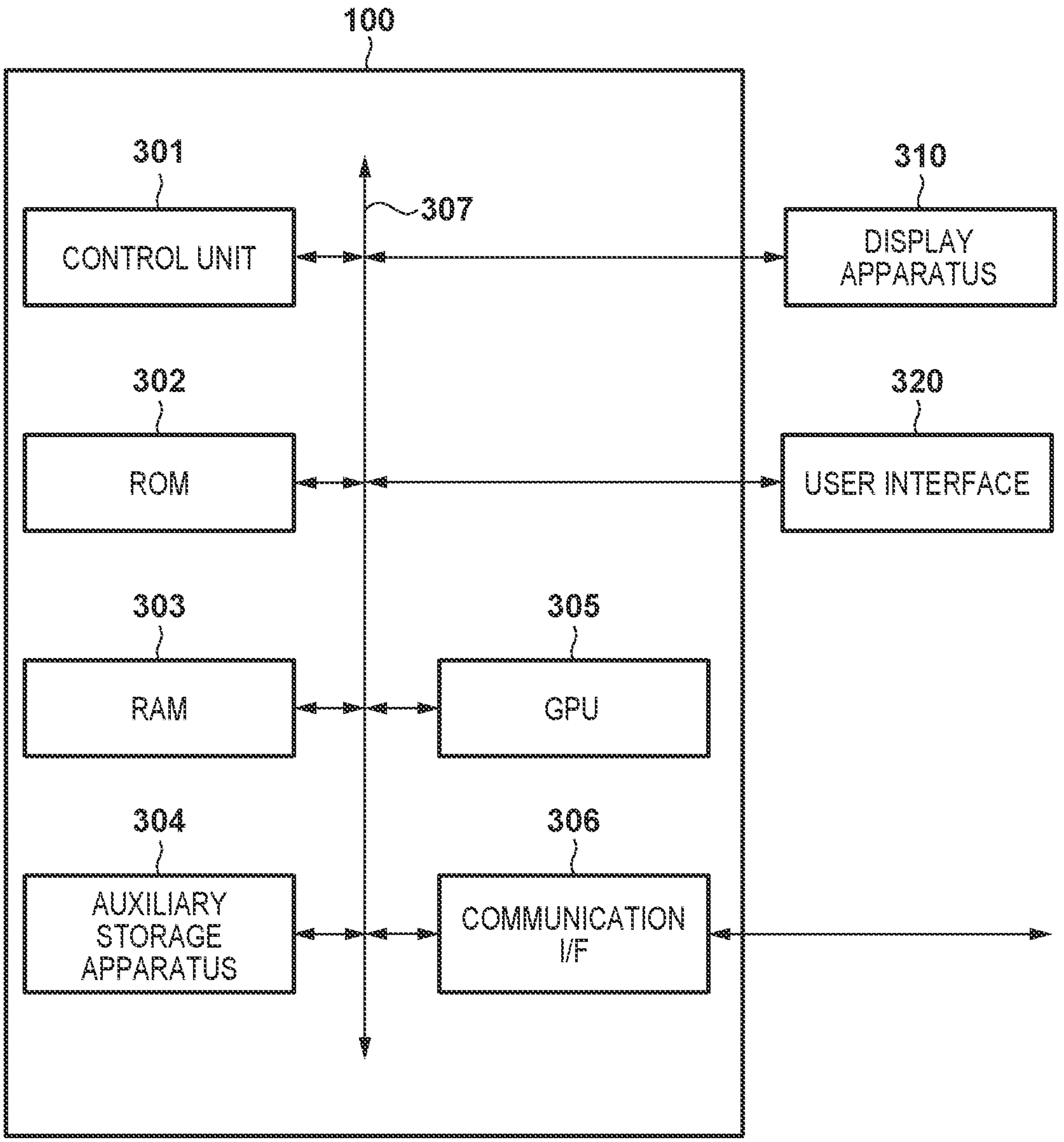
FIG. 3 is a block diagram illustrating an example of the hardware configuration of an image processing apparatus 100 according to the embodiments of the present disclosure and the modifications.

Next, the hardware configuration of the image processing apparatus 100 will be described using FIG. 3.

A CPU 301 is a control apparatus that implements the functional configurations included in the image processing apparatus 100 illustrated in FIG. 1. The CPU 301, for example, reads out a program stored in a ROM 302 or an auxiliary storage apparatus 304, loads the program on a RAM 303, and executes the program to control the operations of the hardware included in the image processing apparatus 100. Note that the image processing apparatus 100 may include one or more dedicated pieces of hardware different from the CPU 301 and may be configured so that at least a part of the processing by the CPU 301 is executed using the one or more dedicated pieces of hardware. Examples of dedicated hardware includes an application specific integrated circuit (ASIC), a field-programmable gate array (FPGA), a digital signal processor (DSP), and the like.

The ROM 302 is a storage apparatus that can permanently store information such as a non-volatile memory and stores programs and the like that do not required changing. The auxiliary storage apparatus 304 is, for example, a storage apparatus that can permanently store information such as a hard disk drive and stores an OS, application programs, and the like. The ROM 302 and the auxiliary storage apparatus 304 may store, in addition to programs, image data, audio data, and data required for various types of processing. Also, the RAM 303 is a storage apparatus that can temporarily store information such as a volatile memory. The RAM 303 is used not only as a work area for loading and executing programs but also as a transitory storage area for read information and information received via a communication I/F 306.

A GPU 305 is a rendering apparatus that implements various types of rendering processing including generating the virtual viewpoint video, generating other screens, and the like. The GPU 305 includes a not-illustrated GPU memory and loads the shape information of the subject received from the image capture system 130, performs a predetermined calculation, and applies the texture data to render the subject, for example. Also, by applying the received texture data associated with the background to a predetermined flat surface or curved surface provided in the three-dimensional space, for example, the background, the field that exists around the subject or the like, can also be rendered by the GPU 305. In this manner, the GPU 305 can generate an image relating to each frame of the virtual viewpoint video. Also, as necessary, the GPU 305 generates various types of screens arranged by the Graphical User Interface (GUI) for the viewer to operate the image processing apparatus 100 with.

The communication I/F 306 controls the exchange of information with an external apparatus. In the present embodiment, the image capture system 130, a display apparatus 310, and a user interface 320 are connected to the image processing apparatus 100, and the communication I/F 306 performs the exchange of information between these apparatuses. In an embodiment in which the communication I/F 306 is provided with a connection terminal of a cable for communication, the image processing apparatus 100 and an external apparatus can have a wired connection. Also, in an embodiment in which the communication I/F 306 is provided with a predetermined antenna for wireless communication, the image processing apparatus 100 and an external apparatus can also have a wireless connection.

The display apparatus 310 is, for example, a liquid crystal display, an LED array for display, or the like and displays various types of images (including the virtual viewpoint video) generated by the GPU 305. In the present embodiment, the CPU 301 controls the display of the display apparatus 310. Also, the user interface 320 includes various types of devices for receiving an operation input, such as a keyboard, a mouse, a joystick, and the like. When there is an operation input to the user interface 320, the user interface 320 outputs a signal corresponding to the operation input. When a signal is received by the communication I/F 306, the communication I/F 306 outputs a control signal corresponding to the operation input to the CPU 301. In an embodiment in which the display apparatus 310 is provided with a function that can detect a touch input such as a touch panel, the user interface 320 may include a touch panel or the like.

Note that in the image processing apparatus 100 according to the present embodiment described herein, the display apparatus 310 and the user interface 320 are hardware detachably provided outside of the image processing apparatus 100. However, the present disclosure is not limited thereto. In other words, in another embodiment, the display apparatus 310 and/or the user interface 320 may be integrally formed with the image processing apparatus 100.

A bus 307 transmits information between the hardware configurations provided inside the image processing apparatus 100. In the embodiment illustrated in FIG. 3, the bus 307 connects the CPU 301, the ROM 302, the RAM 303, the auxiliary storage apparatus 304, the GPU 305, and the communication I/F 306 and implements information transmission between these pieces of hardware.

Accordingly, the various types of functional configurations included in the image processing apparatus 100 are implemented by these hardware configurations included in the image processing apparatus 100. Specifically, the identification unit 103, the camera path generation unit 104, and the display control unit 106 are implemented by the CPU 301, the ROM 302, and the RAM 303. Also, the storage unit 102 is implemented by the auxiliary storage apparatus 304, the video generation unit 105 is implemented by the GPU 305, and the acquiring unit 101 is implemented by the communication I/F 306. Also, the display unit 110 corresponds to the display apparatus 310, and the operation input unit 120 corresponds to the user interface 320.

Hardware Configuration of Image Capture System 130

Figure 4:
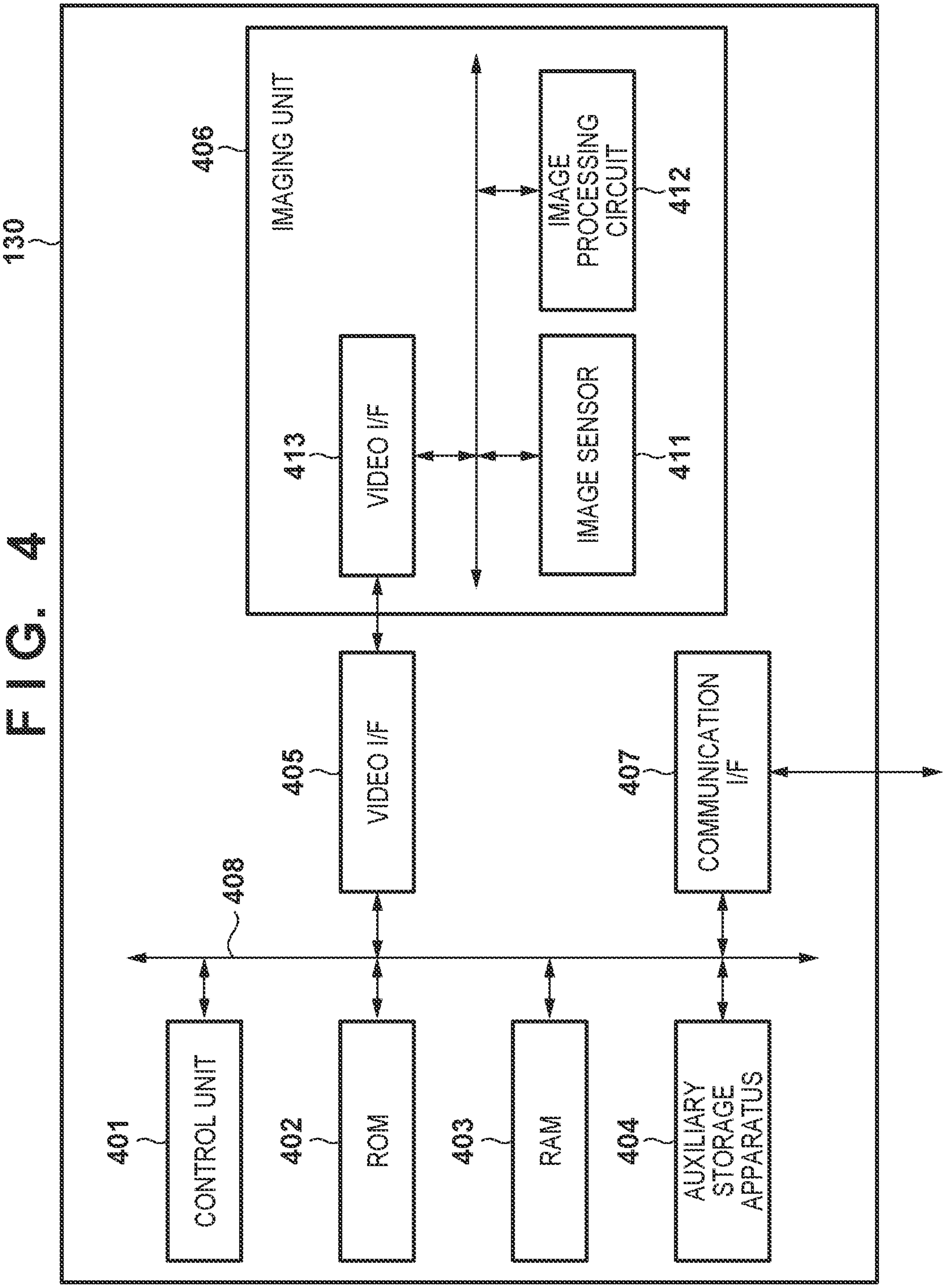
FIG. 4 is a block diagram illustrating an example of the hardware configuration of an image capture system 130 according to the embodiments of the present disclosure and the modifications.

Next, the hardware configuration of the image capture system 130 will be described using FIG. 4. Note that in the present embodiment described herein, the image capture system 130 is one apparatus that manages and controls imaging units 406 (in the example in FIG. 4, only one imaging unit 406 is illustrated), that is the image capture apparatuses 140.

A CPU 401 is a control apparatus that implements the functional configurations included in the image capture system 130 illustrated in FIG. 1. The CPU 401, for example, reads out a program stored in a ROM 402 or an auxiliary storage apparatus 404, loads the program on a RAM 403, and executes the program to control the operations of the hardware included in the image capture system 130. Note that the image capture system 130 may include one or more dedicated pieces of hardware different from the CPU 401 and may be configured so that at least a part of the processing by the CPU 401 is executed using the one or more dedicated pieces of hardware. Examples of dedicated hardware includes an application specific integrated circuit (ASIC), a field-programmable gate array (FPGA), a digital signal processor (DSP), and the like.

The ROM 402 is a storage apparatus that can permanently store information such as a non-volatile memory and stores programs and the like that do not required changing. The auxiliary storage apparatus 404 is, for example, a storage apparatus that can permanently store information such as a hard disk drive and stores an OS, application programs, and the like. The ROM 402 and the auxiliary storage apparatus 404 may store, in addition to programs, image data, audio data, and data required for various types of processing. Also, the RAM 403 is a storage apparatus that can temporarily store information such as a volatile memory. The RAM 403 is used not only as a work area for loading and executing programs but also as a transitory storage area for read information and information received via a communication I/F 407.

A video I/F 405 acquires video from the imaging units 406 included in the image capture system 130. The video acquired by the video I/F 405 from the imaging units 406 include, in addition to video captured by the imaging units 406, silhouette images and texture data.

Each imaging unit 406 is an image capture apparatus arranged at different positions on the periphery of a field where the subject is in a manner so that the field is shown within the image capture area. The detailed hardware configuration of the imaging unit 406 is omitted, but the imaging unit 406 includes an image sensor 411, an image processing circuit 412, and a video I/F 413, as simply illustrated.

The image sensor 411 is constituted by a photoelectric conversion element group and converts a light beam incident on the imaging unit 406 via a not-illustrated lens into an electrical signal (analog image signal) and outputs the electrical signal. The output analog image signal is converted to a digital image signal (captured image) or a video signal (video) by the image processing circuit 412 applying development processing and various types of image processing. Also, the image processing circuit 412 executes separation of the background region and the subject region in the captured image and generates a silhouette image and corresponding texture data. The image processing circuit 412 may also execute various types of compressing processing or the like to generate a video of a predetermined encoding format as necessary. Also, the video I/F 413 is a video output interface included in each imaging unit 406 that outputs video, a silhouette image, and texture data. The video and the like output by the video I/F 413 are brought together in the apparatus that manages and controls the image capture system 130 via the video I/F 405.

The communication I/F 407 controls the exchange of information with an external apparatus. In the present embodiment, the image processing apparatus 100 is connected to the image capture system 130, and the communication I/F 407 performs the exchange of information with the image processing apparatus 100. In an embodiment in which the communication I/F 407 is provided with a connection terminal of a cable for communication, the image capture system 130 and an external apparatus can have a wired connection. Also, in an embodiment in which the communication I/F 407 is provided with a predetermined antenna for wireless communication, the image capture system 130 and an external apparatus can also have a wireless connection.

A bus 408 transmits information between the hardware configurations provided inside the image capture system 130. In the embodiment illustrated in FIG. 4, the bus 408 connects the CPU 401, the ROM 402, the RAM 403, the auxiliary storage apparatus 404, the video I/F 405, the imaging units 406, and the communication I/F 407 and implements information transmission between these pieces of hardware.

Accordingly, the various types of functional configurations included in the image capture system 130 are implemented by these hardware configurations included in the image capture system 130. Specifically, the shape deriving unit 131 is implemented by the CPU 401, the ROM 402, and the RAM 403. The data storage unit 132 is implemented by the auxiliary storage apparatus 404. Also, the image capture apparatuses 140 correspond to the imaging units 406, the image capture unit 141 is implemented by the image sensor 411 and the image processing circuit 412 of each imaging unit 406, and the separation unit 142 is implemented by the image processing circuit 412.

Summary of Introduction Video

In the image processing system according to the present embodiment, during the display of the content, that is the virtual viewpoint video (referred to as main video below), being viewed by the user, one or more advertisement videos are displayed. When an advertisement video is displayed, each time, the display unit 110 switches the display between the main video and the advertisement video. The advertisement video is video displayed as an in-stream advertisement.

The advertisement video is a video with content preconfigured to appropriately convey to a consumer to appeal of a product to be advertised, for example. The advertisement video typically is configured without consideration of the video captured by the image capture system 130, and thus there is likely to be a low association between the advertisement video and the main video. In some cases, when there is a low association between the main video and the advertisement video, switching from the main video to the advertisement video may greatly interrupt the viewing experience of the viewer. As a result, the sponsor that provided the advertisement may not obtain the desired advertisement effect.

In regards to this, in the image processing system according to the present embodiment, in order to increase the advertisement effect of the advertisement video, prior to displaying the advertisement video, the introduction video is displayed to guide the line-of-sight toward the target object corresponding to the advertisement object and arouse the interest of the viewer therein. The introduction video is a virtual viewpoint video but with a different method of determining the virtual viewpoint to that of the main video. Specifically, the main video and the introduction video are different in that, with the main video, the virtual viewpoint is determined on the basis of an operation input by the viewer acquired via the operation input unit 120 and, with the introduction video, the virtual viewpoint is determined on the basis of the introduction camera path information generated by the camera path generation unit 104.

Generation of Introduction Camera Path Information

The contents of the processing for generating the introduction camera path information relating to the advertisement object (product or the like) will be described below with reference to the drawings. As described above, the various types of information (advertisement video, reference camera path information, and object information) relating to the advertisement object are stored in the storage unit 102. When the advertisement video is displayed, the advertisement object to be advertised is determined, and introduction camera path information is generated on the basis of the object information and the reference camera path information relating to the advertisement object. In the embodiment described hereinafter, a soccer ball is used as an example of the advertisement object.

Figure 5A:
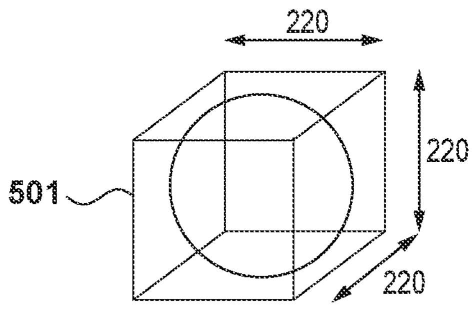
FIGS. 5A and 5B are diagrams for describing object information according to the embodiments of the present disclosure and the modifications.

The identification unit 103 identifies the subject of the advertisement object as a target object from the subjects within the image capture area (field) with the shape derived by the shape deriving unit 131 of the image capture system 130 on the basis of shape defining information of the advertisement object. In the present embodiment, the identification unit 103 identifies the soccer ball as the target object. For example, the shape defining information relating to a soccer ball with a diameter of 22 cm is defined as a voxel group with a shape inscribed in a bounding box 501 measuring 220×220×220 illustrated in FIG. 5A. The identification unit 103 identifies the subject corresponding to the shape defining information relating to the soccer ball acquired by the acquiring unit 101 as the target object. The identification unit 103 outputs the position information of the identified target object to the camera path generation unit 104. In other words, in the example in FIG. 2, the identification unit 103 outputs the three-dimensional position of the ball 212 in the three-dimensional space corresponding to the field 200 to the camera path generation unit 104.

Note that in the present embodiment, in order to easily identify the subject corresponding to the advertisement object, in the information (shape information) of the three-dimensional shape of the subject and the shape defining information, the size in each direction of the bounding box is defined. In the present embodiment, the identification unit 103 performs identification via the degree of match between the size of the bounding box in the information (shape information) of the three-dimensional shape of the subject and the shape defining information. However, the present disclosure is not limited thereto, and the subject corresponding to the advertisement object may be identified using a known method for searching for similar three-dimensional shapes including comparing the feature values of voxel groups and the like.

The camera path generation unit 104 generates introduction camera path information with a defined camera path relating to the introduction video on the basis of the position information of the target object (soccer ball) input from the identification unit 103. The introduction video is video displayed to raise the awareness of the viewer with respect to the advertisement target before the advertisement video is displayed. Accordingly, the introduction video is preferably a virtual viewpoint video that seamlessly transitions from the immediately preceding virtual viewpoint of the main video to a virtual viewpoint that focuses on the soccer ball. For example, in the introduction camera path information, a camera path from the current virtual viewpoint of the main video to a virtual viewpoint that gives a natural close-up of the soccer ball is defined.

Figure 5B:
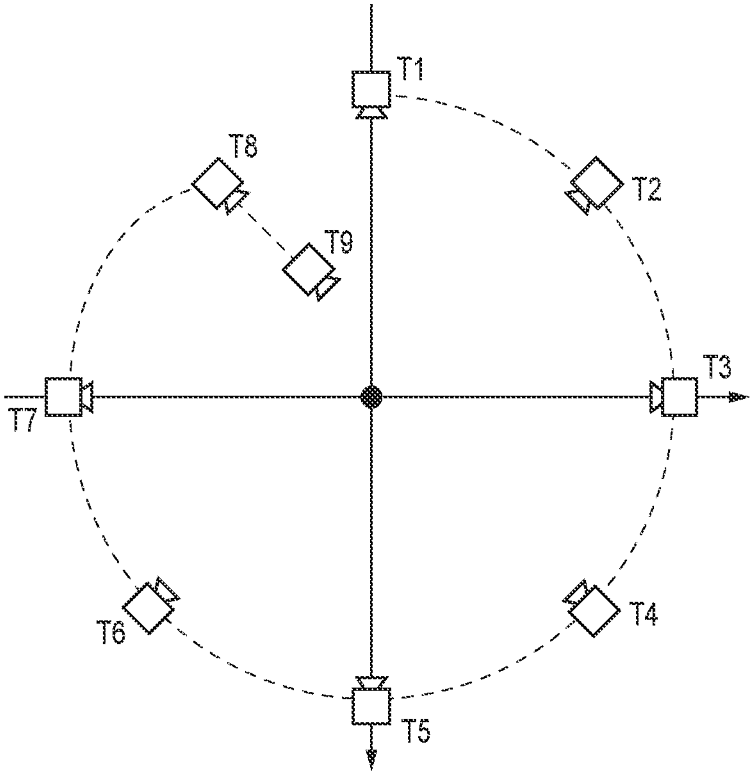

Regarding the introduction video displayed before the advertisement video, a default camera path is defined in the reference camera path information. For example, in the reference camera path information relating to the soccer ball, as illustrated in FIG. 5B, a movement path of the virtual viewpoint is defined that includes circling around the soccer ball for a predetermined amount of time (from time T1 to T8) before moving toward the soccer ball (time T9). Since the soccer ball is an object that can move to various positions during the game, in the reference camera path information relating to the soccer ball, the coordinates (position) of the virtual viewpoint is defined with the soccer ball as the origin point as illustrated in FIGS. 5B and 6A, for example. In other words, regarding the movement path of the virtual viewpoint defined in the reference camera path information relating to the soccer ball, the position of the virtual viewpoint at each time is represented by relative coordinates (X, Y, Z) set with the target object as the reference (origin point).

Also, in the reference camera path information, the line-of-sight direction of the virtual viewpoint is defined. In the present embodiment, the line-of-sight direction of the virtual viewpoint is expressed using three parameters, pan, tilt, and roll. The three parameters, pan, tilt, and roll are each represented by an angle formed with the X axis, Y axis, and Z axis, respectively. For example, at time T1, the line-of-sight direction of the virtual viewpoint, with respect to the Y axis, is pointed in the negative Y-axis direction and is angled down 45 degrees with respect to the XY plane.

(pan, tilt, roll)=(0, 45, 0)

In the present embodiment, regarding the line-of-sight movement relating to the reference camera path information, the line-of-sight direction (pan, tilt, and roll) of the virtual viewpoint is defined so that the advertisement object stays shown at a predetermined position of the field of view (field angle). In the examples in FIGS. 5B and 6A, the reference camera path information is defined so that the soccer ball stays shown in the center of the field of view from time T1 to time T9, within a predetermined distance from the soccer ball (distance 5000=within 5 m). Note that for presentation purposes, the line-of-sight direction of the virtual viewpoint can be set to not show the advertisement object. By using such reference camera path information to generate introduction camera path information, a virtual viewpoint video continually showing the soccer ball, that is the target object relating to the advertisement video, can be displayed as the introduction video.

Figure 7A:
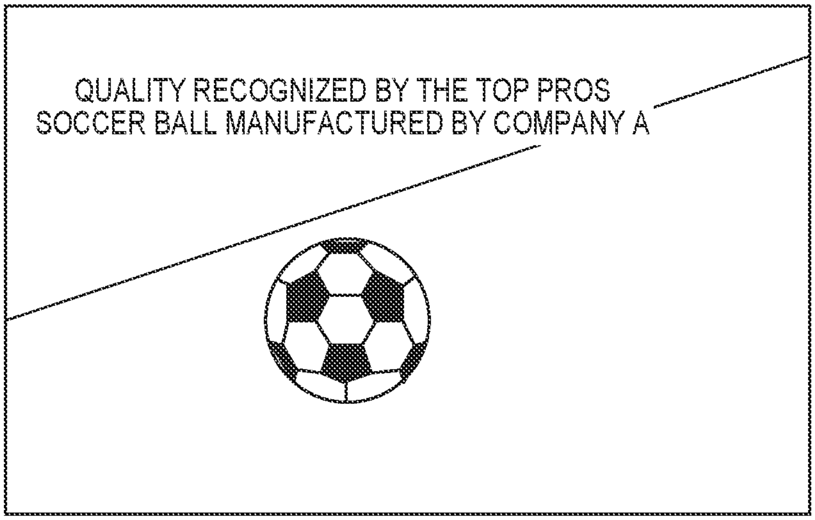
FIGS. 7A and 7B are diagrams for describing control of a virtual viewpoint according to a second embodiments of the present disclosure.
Figure 7B:
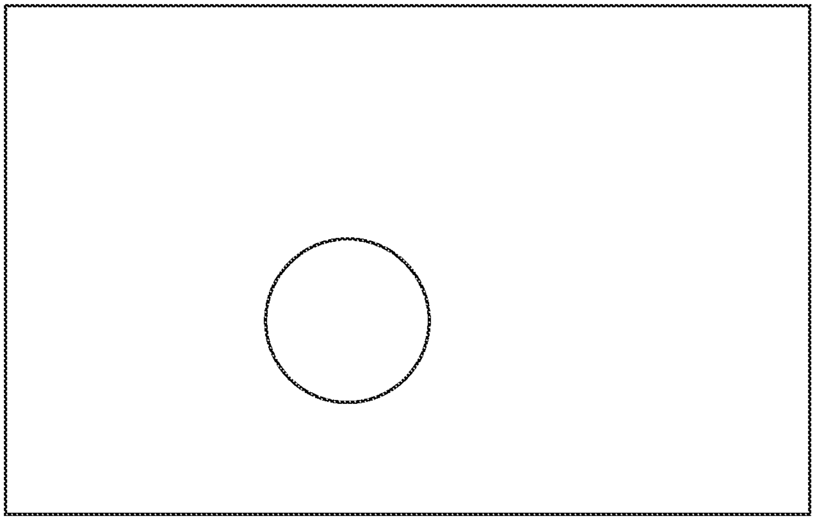

Here, by setting the position and the line-of-sight direction of the virtual viewpoint at time T9 so that the position and size of the soccer ball in the field of view are the same as in the display contents of an opening portion (for example, the first frame) of the advertisement video, the transition from the introduction video to the advertisement video can be presented in a particularly seamless manner. In other words, when the image of the first frame of the advertisement video is as illustrated in FIG. 7A, for example, by setting the virtual viewpoint of the last frame of the introduction video so that the soccer ball is shown in the field of view as in the composition illustrated in FIG. 7B, the advertisement video can be seamlessly displayed.

The absolute coordinates of the virtual viewpoint relating to the introduction camera path information are derived using the three-dimensional position of the target object. For example, take the ball 212 illustrated in FIG. 2 and its absolute coordinates of (X, Y, Z) corresponding to (50000, 15000, 0). By adding the coordinates of the virtual viewpoint defined by the relative coordinates to the reference camera path information, the coordinates of the virtual viewpoint relating to the introduction camera path information are obtained. In the present embodiment, the camera path generation unit 104 adds the position information of the ball 212 to each relative coordinate of the virtual viewpoint defined by the reference camera path information to derive the absolute coordinates of the virtual viewpoint of the introduction video. For example, when the reference camera path information relating to the soccer ball is as illustrated in FIG. 6A, the camera path generation unit 104 can derive the introduction camera path information indicating the absolute coordinates of the introduction video as illustrated in FIG. 6B.

Figure 8A:
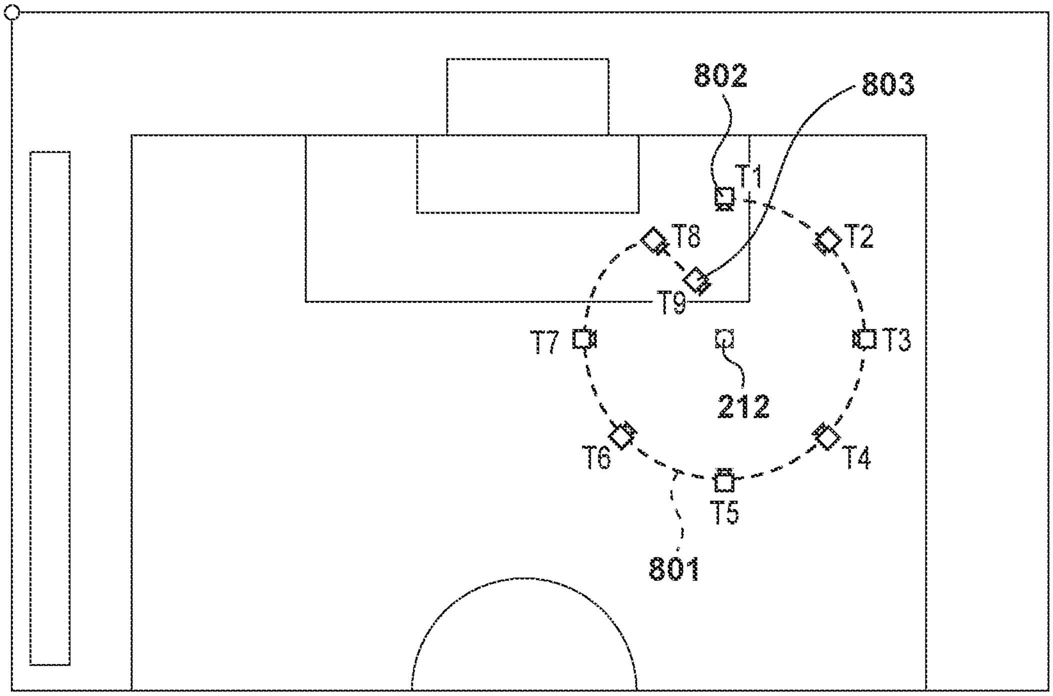
FIGS. 8A and 8B are diagrams for describing introduction camera path information according to the embodiments of the present disclosure and the modifications.

The camera path generation unit 104 can generate the introduction camera path information on the basis of the reference camera path information relating to the soccer ball and the position information of the ball 212 for a predetermined frame period immediately preceding the switch to the advertisement video. In other words, the camera path generation unit 104 generates viewpoint movement of a camera path 801 illustrated in FIG. 8A as the introduction camera path information for the period. As illustrated in FIG. 8A, at start time T1 of the introduction video, the camera path 801 uses position 802 (coordinates (X, Y, Z)=(5000, 10000, 1000)) as the starting point of the virtual viewpoint. The camera path 801 defines a camera path in which the virtual viewpoint moves in a circular path from time T1 to time T8 of the introduction video. Also, at the end time T9 (last frame), the camera path 801 uses a position 803 approaching the ball 212 as the end point of the virtual viewpoint. Note that the track relating to the camera path 801 matches the camera path relating to the reference camera path information illustrated in FIG. 5B.

Here, the main video displayed before switching to the introduction video is a virtual viewpoint video from a virtual viewpoint set according to an operation by the viewer. Thus, at the time when the advertisement video is displayed, the coordinates of the virtual viewpoint of the main video may be different from the starting point (position 802) of the camera path 801.

Figure 8B:
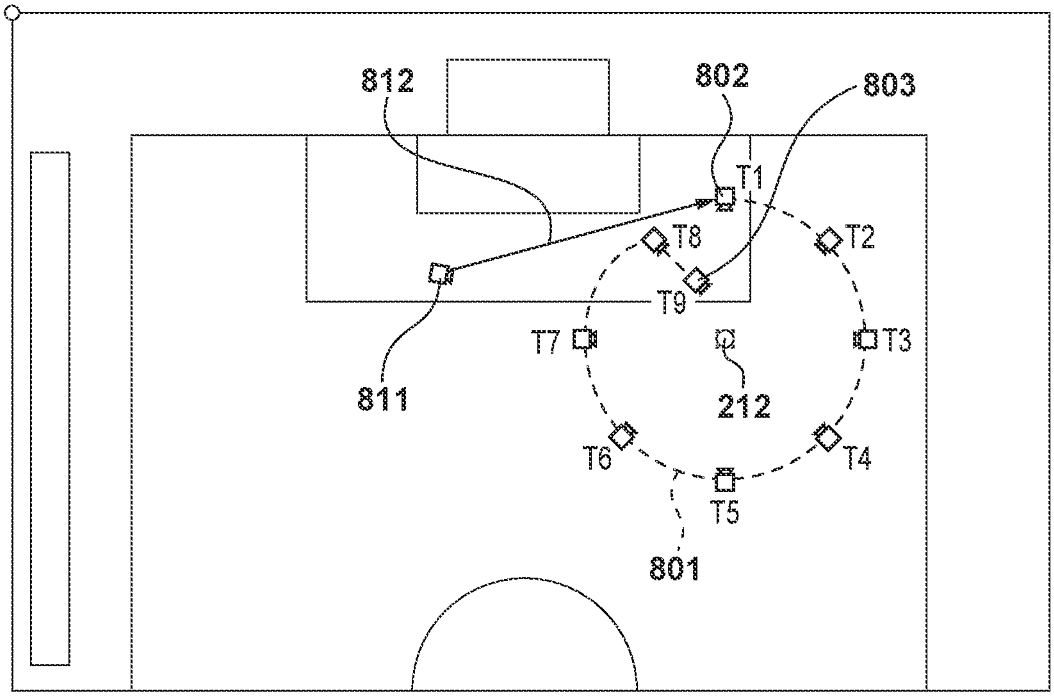
Figure 9A:
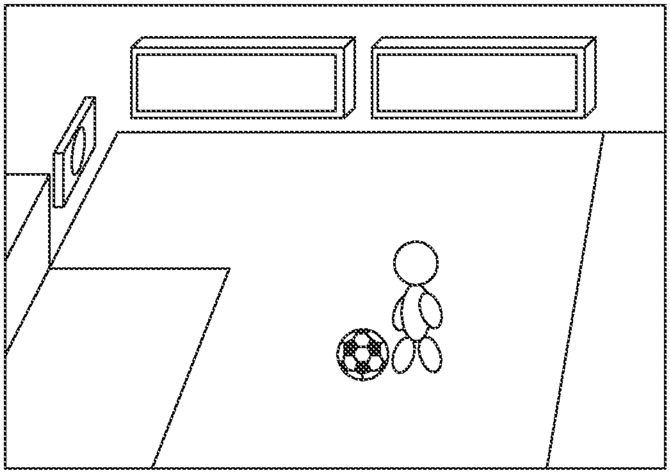
FIGS. 9A, 9B, and 9C are diagrams for describing continuity in virtual viewpoint videos according to the embodiments of the present disclosure and the modifications.
Figure 9B:
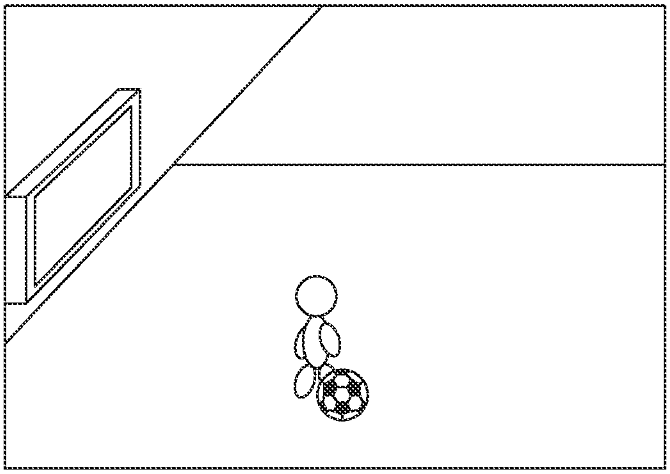

For example, as with a position 811 illustrated in FIG. 8B, when the virtual viewpoint of the main video is set at a position away from the position 802, that is the starting point of the camera path 801, continuity in terms the video is lost when switching from the main video to the introduction video. An example of this is, when the video from the virtual viewpoint of the main video is as illustrated in FIG. 9A, the opening of the introduction video displayed in the next frame being the composition illustrated in FIG. 9B. In such a case, the pleasurable viewing experience of the viewer is interrupted, and the advertisement effect of the advertisement video may be decreased.

With the present embodiment, the switch from the main video to the introduction video is made seamless for the viewer. First, the camera path generation unit 104 evaluates the continuity between the position and the line-of-sight direction of the virtual viewpoint at the starting point of the introduction video and the current position and line-of-sight direction of the virtual viewpoint of the main video. Any method may be used for the evaluation, however when virtual viewpoint videos relating to these two virtual viewpoints are displayed in order, an evaluation of yes for continuity is given when the change in the display content is of an amount which provides a seamless experience for the viewer and an evaluation of no for continuity is given when the amount does not.

Also, when the two virtual viewpoints are evaluated as yes for continuity, the camera path generation unit 104 generates the introduction camera path information for only the camera path defined on the basis of the reference camera path information. In other words, the introduction camera path information is generated with contents with the virtual viewpoint at time T1 as the virtual viewpoint of the opening frame of the introduction video.

On the other hand, when the two virtual viewpoints are evaluated as no for continuity, the camera path generation unit 104 generates the introduction camera path information as follows. The camera path generation unit 104 generates, in addition of the camera path defined on the basis of the reference camera path information, introduction camera path information including a camera path relating to viewpoint movement from the virtual viewpoint of the main video to the starting point of the camera path. In other words, the camera path generation unit 104 further includes in the introduction camera path information a camera path from the virtual viewpoint relating to the main video to the virtual viewpoint relating to the movement to the starting point of the introduction video. Hereinafter, the camera path defined on the basis of the reference camera path information is referred to as the predetermined camera path. Also, the camera path from the virtual viewpoint relating to the main video to the virtual viewpoint relating to the movement to the starting point of the introduction video is referred to as the supplementary camera path.

Here, as illustrated in FIG. 8B, the supplementary camera path may be defined using a camera path 812 that joins the position 811 of the virtual viewpoint relating to the main video being displayed and the starting point (position 802) of the predetermined camera path in a straight line. Alternatively, the supplementary camera path may be defined using a known method for generating a camera path from a plurality of specified coordinates including a supplementation method using a smooth curved line, such as a Bézier curve, a spline curve, or the like.

In this manner, when an evaluation of no continuity is given for the virtual viewpoint relating to the main video and the virtual viewpoint relating to the starting point of the predetermined camera path, the camera path generation unit 104 defines the supplementary camera path. Then, the camera path generation unit 104 generates the introduction camera path information with a camera path joining the supplementary camera path and the predetermined camera path. In other words, the introduction camera path information generated at this time corresponds to content in which the virtual viewpoint being displayed or the virtual viewpoint of the supplementary camera path closest to the virtual viewpoint being displayed corresponds to the virtual viewpoint of the opening frame of the introduction camera path information. Also, the generated introduction camera path information corresponds to content of the virtual viewpoint at time T1 of the predetermined camera path at the end point of the supplementary camera path.

Accordingly, even when the virtual viewpoint relating to the main video being displayed is different from the starting point of the predetermined camera path, the interest of the viewer is guided toward the target object so that the viewer can be given a seamless experience, and allowing for viewing of the advertisement video to be effective.

Advertisement Display Processing

Figure 10:
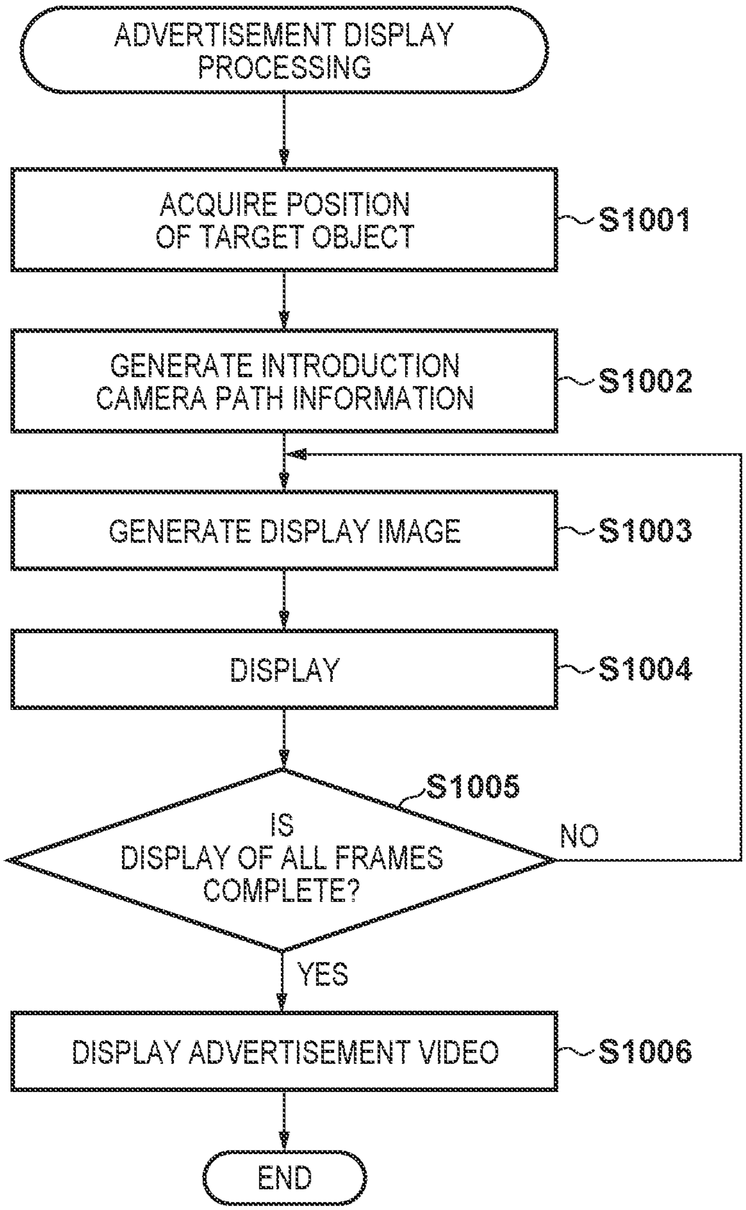
FIG. 10 is a flowchart illustrating an example of advertisement display processing according to the embodiments of the present disclosure.

The advertisement display processing executed by the image processing apparatus 100 according to the present embodiment relating to the display of the advertisement video will be described below in detail using the flowchart of FIG. 10. The processing corresponding to the flowchart can be implemented by the CPU 301 by reading a corresponding processing program stored in the ROM 302, loading the program on the RAM 303, and executing the program, for example. The present advertisement display processing described below is started when, in the period in which processing to display the main video on the display apparatus 310 is executed, for example, it is detected that a predetermined advertisement video display timing is reached. Note that when describing the advertisement display processing according to the present embodiment, to facilitate understanding, the advertisement object is one type (a soccer ball). Note that while the advertisement video is being displayed, control is performed so that operations relating to the virtual viewpoint video, that is the main video, by the viewer are not accepted.

In step S1001, the CPU 301 identifies the subject (target object) corresponding to the advertisement object in the three-dimensional space relating to the content being viewed and acquires the position information. In the present embodiment, the CPU 301 identifies the target object corresponding to the advertisement object on the basis of the shape information of the subject shown in the video input from the image capture system 130 and the shape information indicating the shape corresponding to the shape defining information relating to the advertisement object. Also, the CPU 301 acquires the position information of the subject corresponding to the shape information as the position information of the target object.

In step S1002, the CPU 301 generates introduction camera path information relating to the current display of the advertisement video. Specifically, the CPU 301 defines the predetermined camera path on the basis of the position information of the target object and the reference camera path information of the advertisement object. Also, the CPU 301 evaluates the continuity between the virtual viewpoint relating to the main video being displayed and the virtual viewpoint relating to the starting point of the predetermined camera path. When the evaluation is no continuity, the CPU 301 further defines a supplementary camera path. Also, the CPU 301 generates introduction camera path information using the defined camera path. Note that the camera path included in the introduction camera path information defines the position and line-of-sight direction of the virtual viewpoint for each frame of the introduction video.

In step S1003, the GPU 305, under control of the CPU 301, generates a display image (virtual viewpoint video) for one frame of the introduction video. Specifically, the GPU 305 sets the virtual viewpoint for the frame on the basis of the introduction camera path information generated in step S1002. The first frame of the introduction video corresponds to the first frame set in the introduction camera path information. Also, the GPU 305 generates a display image relating to the content being viewed at the set virtual viewpoint.

In step S1004, the CPU 301 causes the display apparatus 310 to display the display image generated in step S1003.

In step S1005, the CPU 301 determines whether or not display of the display images relating to all of the frames defined in the introduction camera path information is complete. When the display of the display images relating to all of the frames defined in the introduction camera path information is complete, the CPU 301 moves the processing to step S1006. When the display of the display images relating to all of the frames is not complete, the CPU 301 sets, from among the frames defined in the introduction camera path information, the frame following the frame rendered in step S1003 as the frame to be rendered and returns the processing to step S1003. Accordingly, regarding the virtual viewpoints relating to all of the frames defined in the introduction camera path information, the display images are generated in order and displayed on the display apparatus 310, allowing presentation of the introduction video to the viewer to be achieved.

In step S1006, the CPU 301 switches the display on the display apparatus 310 from the introduction video to the advertisement video. Specifically, the CPU 301 reads out the advertisement video relating to the advertisement object from the auxiliary storage apparatus 304 and causes the display apparatus 310 to display the images relating to each frame of the advertisement video in order. When the display on the display apparatus 310 of the images relating to all of the frames of the advertisement video is complete, the CPU 301 ends the present advertisement display processing and re-executes the display processing of the main video. After completion of the advertisement display processing, the viewer can once again set the virtual viewpoint to a discretionary virtual viewpoint and view the main video. At this time, the virtual viewpoint relating to rendering of the main video when viewing is restarted may be, for example, the virtual viewpoint used at the last frame for the introduction video or may be sequentially changes using a defined camera path to return the virtual viewpoint to the virtual viewpoint of before the start of the advertisement display processing.

As described above, according to the image processing apparatus according to the present embodiment, an advertisement display with an improved advertisement effect can be performed during display of a virtual viewpoint video. Specifically, when switching the display from the main video to the advertisement video relating to the advertisement object, since a virtual viewpoint video focused on the corresponding target object is displayed as the introduction video, the viewing can smoothly transition to the advertisement video for the viewer.

Note that the advertisement display processing described above is premised on the target object not moving after the introduction camera path information is generated in step S1002 to facilitate understanding, but the present disclosure is not limited thereto. For example, when the target object moves after the introduction camera path information is generated, by adding the movement amount of the target object after the generation to the coordinates of the virtual viewpoint defined by the introduction camera path information, an introduction video obtained by tracking the target object can be displayed.

Figure 9C:
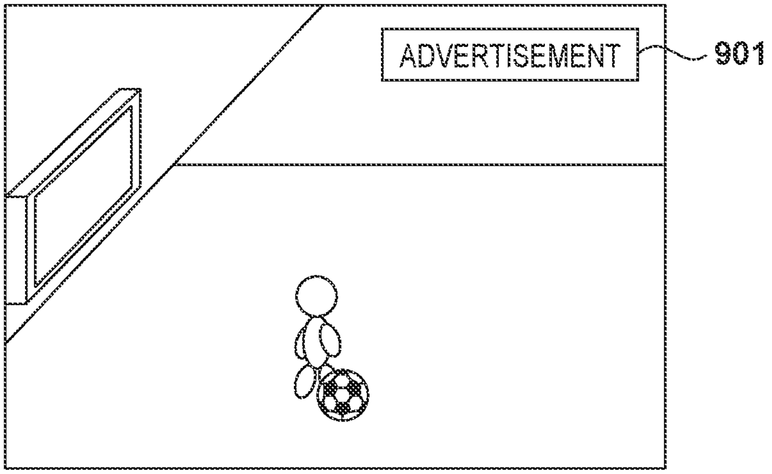

Also, in the advertisement display processing according to the embodiment described above, after the processing starts, the virtual viewpoint relating to the rendering of the virtual viewpoint video changes on the basis of the introduction camera path information and not an operation input by the viewer. In other words, with the embodiment described above, since the virtual viewpoint video (introduction video) that movies the viewpoint is forcibly switched to while the viewer is viewing the virtual viewpoint video (main video), the viewer may mistakenly think that they accidentally input an operation relating to changing the viewpoint. Thus, when the display is switched from the main video to the introduction video, a notification indicating the advertisement has started may be additionally displayed. For example, a banner display such as that denoted by 901 in FIG. 9C may be performed to inform the user of the advertisement video.

Second Embodiment

In the embodiment described above, in the reference camera path information relating to the soccer ball, the virtual viewpoint transition is defined so that the soccer ball stays shown in the center of the field of view. However, the present disclosure is not limited thereto. Here, by setting the position and the line-of-sight direction of the virtual viewpoint relating to the last frame of the introduction video so that the position and size of the soccer ball in the field of view are the same as in the display of an opening portion (for example, the first frame) of the advertisement video, the transition from the introduction video to the advertisement video can be displayed in a particularly seamless manner. For example, consider an example in which the image of the first frame of the advertisement video is as illustrated in FIG. 7A. In this example, by setting the virtual viewpoint of the last frame (T9) of the introduction video so that the soccer ball is shown in the field of view as in the composition illustrated in FIG. 7B, the display can more seamlessly switch from the introduction video to the advertisement video.

Figure 13A:
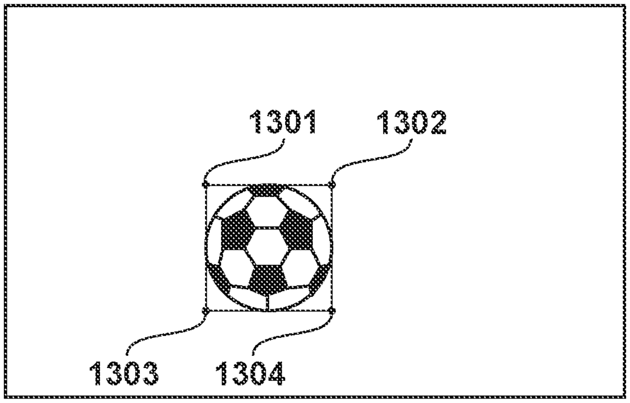
FIGS. 13A, 13B, and 13C are more diagrams for describing control of a virtual viewpoint according to the second embodiment of the present disclosure.

In order to achieve such a seamless switch of display, in the image processing system according to the present embodiment, with the image processing apparatus 100, the position and the size of the image of the corresponding object in the image of the first frame of the advertisement video is extracted (detected) in advance. Specifically, the CPU 301 reads out the image of the first frame of the advertisement video stored in the storage unit 102 before the advertisement display processing is executed and extracts an image of the target object from the image using a known image recognition technique. Then, for the extracted target object, the CPU 301 acquires the coordinates of the four corners of a bounding rectangle of the target object, for example. For example, when the target object is the soccer ball and the first frame of the advertisement video is as illustrated in FIG. 7A, by extracting an image of a soccer ball, coordinates 1301 to 1304 of the four corners of a bounding rectangle 1300 illustrated in FIG. 13A are derived. The extracted information of the coordinates of the four corners of the bounding rectangle is associated with the target object or the corresponding advertisement video and stored in the ROM 302, for example.

Then, in step S1005 of the advertisement display processing, after the display of the display images relating to all of the frame defined in the introduction camera path information is determined to be complete, the CPU 301 evaluates the continuity in terms of the image of the target object between the most recent display image and the first frame of the advertisement video. Specifically, the CPU 301 evaluates the image continuity between the image of the first frame of the advertisement video and the most recent display image on the basis of the coordinates of the four corners of the bounding rectangle of the target object. In other words, by comparing the coordinates of the four corners, the CPU 301 identifies the difference in position and the difference in size of the image of the target object between the images and evaluates the continuity of the images on the basis thereof.

Here, the coordinates of the four corners of the image of the target object in the most recent display image can be derived by executing processing to extract the image of the target object for the generated display image in a similar manner as to that executed for the first frame of the advertisement video. Alternatively, the coordinates of the four corners can be derived on the basis of the three-dimensional position of the target object in the three-dimensional space, the object information relating to the object, and information of the position and line-of-sight direction of the virtual viewpoint set most recently. For example, on the basis of a calculation executed when the display image is generated from the GPU 305, the CPU 301 can acquire the information of the coordinates of the four corners relating to a two-dimensional region (corresponding to the bounding rectangle) where the image is rendered as the position of the image of the target object in the display image.

When the coordinates of the four corners of the bounding rectangle relating to the most recent display image and the coordinates of the four corners of the bounding rectangle relating to the first frame of the advertisement video match, the evaluation by the CPU 301 is yes for continuity, and when they do not match, the evaluation is no for continuity. When the evaluation by the CPU 301 is no for continuity, the CPU 301 does not move the processing to step S1006 and performs control to further display an introduction video in order to produce a match. Specifically, the CPU 301 sets the virtual viewpoint for an additional frame subsequent to the last frame (T9) defined in the introduction camera path information. Also, the CPU 301 causes the GPU 305 to generate a display image (virtual viewpoint video) based on the virtual viewpoint and further displays the generated display image as the introduction video. In other words, in the present embodiment, as necessary, the CPU 301 extends the introduction video beyond the number of frames defined in the introduction camera path information and executes display control using the extended frames to make it easier for the viewer to view the advertisement video.

Figure 13B:
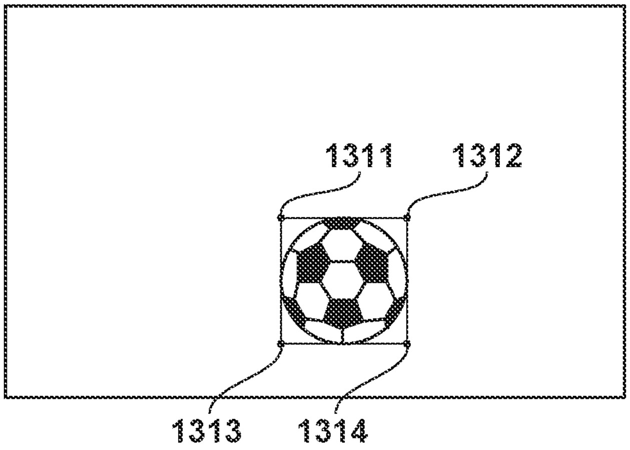
Figure 13C:
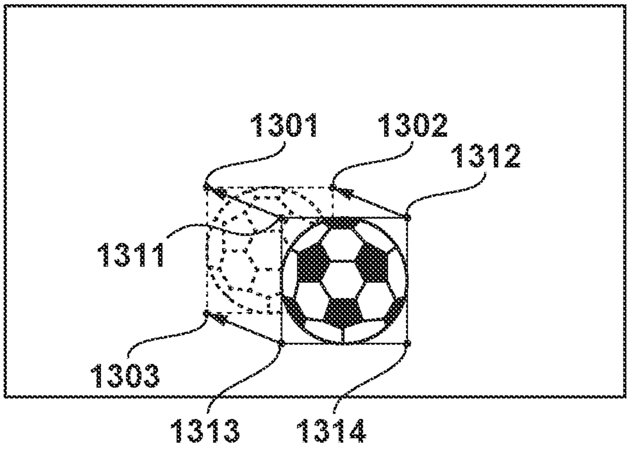

The virtual viewpoint relating to the additional frames is determined so that the position and the size of the image of the target object in the generated display image matches that in the image relating to the first frame of the advertisement video. For example, as illustrated in FIG. 13B, in the display image of the last frame (T9) of the introduction camera path information, the four corners of a bounding rectangle 1310 of the image of the soccer ball is distributed at coordinates 1311 to 1314. In the additional frame of the introduction video at this time, as illustrated in FIG. 13C, the CPU 301 executes control to make the coordinates 1311, 1312, 1313, and 1314 of the bounding rectangle 1310 match the coordinates 1301, 1302, 1303, and 1304.

For this control, an algorithm for automatic tracking of an object using a surveillance camera or the like may be used, for example. Specifically, the CPU 301 executes control to reduce the difference in the position and size of the bounding rectangles of the images of the target objects by changing, from among the parameters of the virtual viewpoint, the rotation parameters pan, tilt, and the like, and the XYZ coordinates and zoom parameter as necessary.

Also, when the image of the target object in the additional frame of the introduction video matches the image of the same object in the first frame of the advertisement video, the CPU 301 moves the processing to step S1006 and switches the display of the display apparatus 310 from the introduction video to the advertisement video. In this manner, when playback of the advertisement video follows the introduction video, a seamless switch can be achieved. Thus, the advertisement effect can be increased by having the viewer viewing the main video focus on the target object in the introduction video, that is the virtual viewpoint video, and then smoothly transitioning to viewing the advertisement video corresponding to the object.

Note that in the present embodiment described above, mainly by making the image of the target object match in the last frame of the introduction video and the first frame of the advertisement video, a seamless switch from the introduction video to the advertisement video can be achieved. However, the present disclosure is not limited thereto, and a visual difference between the frames may be reduced by executing control. For example, in an embodiment in which the target object is a soccer ball and the soccer ball is depicted on grass in the opening portion of the advertisement video, image correction processing (color conversion processing) may be additionally executed to reduce the difference in the color temperature and the average brightness of the grass in the videos. In other words, by matching not only the region of the subject focused on in the introduction video but also the color or the like in the background region, the viewer can be given a more seamless viewing of the advertisement video.

Also, a seamless switch from the introduction video to the advertisement video can be performed even when the position and the size of the images of the target object do not match. In other words, as long as continuity in terms of the position and size of the images of the target object can be ensured between the image of the last frame of the introduction video and the image of the first frame of the advertisement video, the images are not required to match. For example, continuity may evaluated in terms of whether or not the extension of the viewpoint control connects to the virtual viewpoint corresponding to the first frame of the advertisement video on the basis of the movement and rotation direction of the virtual viewpoint of the camera path defined in the introduction camera path information. Also, as along as continuity is ensured between the virtual viewpoints when control of the virtual viewpoint is executed using an additional frame of the introduction video, the virtual viewpoint relating to the additional frame is not required to match the virtual viewpoint corresponding to the first frame of the advertisement video.

Also, in the present embodiment described above, control is executed so that, after the display of the display image relating to all of the frames defined in the introduction camera path information is complete, the introduction video is provided with additional frames and the image of the target object matches that of the first frame of the advertisement video. However, the present disclosure is not limited thereto, and at the time when the introduction camera path information is generated in step S1002, the virtual viewpoint of the last frame may be set to the virtual viewpoint corresponding to the first frame of the advertisement video.

Also, in the present embodiment described above, control is executed so that the position and the size of the image of the target object is the same in the first frame of the advertisement video and the final frame of the introduction video. However, the present disclosure is not limited thereto. For example, the image of the target object may not be displayed in the first frame of the advertisement video and may appear after a few frames. In this case, the CPU 301 may execute control of the virtual viewpoint relating to the additional frames of the introduction video so that the position and size of the image of the object matches that of the frame in the introduction video where the image of the target object first appears. In other words, it is sufficient that the virtual viewpoint of the end portion of the introduction video is set so that continuity is ensured in accordance with the display state of the image of the target object in the opening portion of the advertisement video.

Also, in the present embodiment described above, before the advertisement display processing is executed, information relating to the position and size of the image of the target object relating to the advertisement video is derived. However, this may of course be executed during the advertisement display processing. Alternatively, the information is not required to be derived by the image processing apparatus 100 and may be derived by a non-illustrated external apparatus that supplies various types of information relating to the advertisement, for example, and then the image processing apparatus 100 may acquire this information.

First Modification

In the embodiments described above, vertices, a barycenter, or another representative position of the shape information (bounding box) corresponding to the advertisement object is acquired as the position information of the target object. However, the present disclosure is not limited thereto. For example, when the advertisement object is an article that can be distributed to a specific portion of the shape information corresponding to the player, for example, cleated shoes worn by a player, there is a possibility that an introduction video with suitable content is not displayed, even when a representative position of the shape information is used to generate the introduction camera path information. Thus, the position information of the target object, which position in the bounding box relating to the shape information is used may be determined differently depending on the type of the advertisement object. For example, when the advertisement object is cleated shoes, the position information of the target object may be determined as the coordinates of a position where the feet are in the bounding box specified as corresponding to a player.

Second Modification

Also, the advertisement video is not limited to being a product on the field 200. For example, the advertisement video may introduce the maker with a lineup that include a product on the field 200, a sponsor company investing in a soccer club, or a similar company or may include an advertisement video of another product sold by the company. For the introduction video for such an advertisement video, for example, it may be suitable to bring the attention of the viewer to the sponsor logo on a player's uniform or the like. Accordingly, when identifying the target object, the identification unit 103 may identify the position of each subject (player) as well as the orientation and may identify the position and direction that allows for viewing of a sponsor logo. The orientation of the players can be identified via recognition of the shape of the legs or the shape of the arms on the basis of the distribution of voxel groups of shape information relating to the players. In this case, the camera path generation unit 104 derives a camera path producing a close-up of the sponsor logo at the end of the introduction video on the basis of the position and orientation of the target object and generates the introduction camera path information.

Third Modification

In the embodiments and the modifications described above, on the basis of the shape information of the subjects acquired from the shape deriving unit 131, the target object corresponding to the advertisement object is identified on the on the basis of the shape defining information. However, the present disclosure is not limited thereto. For example, at a soccer stadium and the like, signs displaying a sponsor logo, cameras for broadcasting, cameras used by the press, and the like are placed at fixed positions, irrespective of the state of the game. Accordingly, when the target object is a stationary object, it is not necessary to execute identification based on the shape defining information every time, and predetermined position information or the like can be used.

Fourth Modification

In the embodiments described above, the advertisement object is one type of object. However, the present disclosure is not limited thereto. In other words, in an embodiment in which a plurality of types of advertisement videos are stored in the auxiliary storage apparatus 304, it is sufficient for the present disclosure that one of the advertisement videos is selected to be displayed when the advertisement display timing is reached and the introduction video for the advertisement object relating to the advertisement video is displayed. In other words, in the present disclosure, at the advertisement display timing, from among the plurality of target objects corresponding to any one of the plurality of types of advertisement objects, one target object for advertisement video viewing is selected, and the introduction camera path information is generated. Here, the one target object may be selected as follows, for example.

Figure 11:
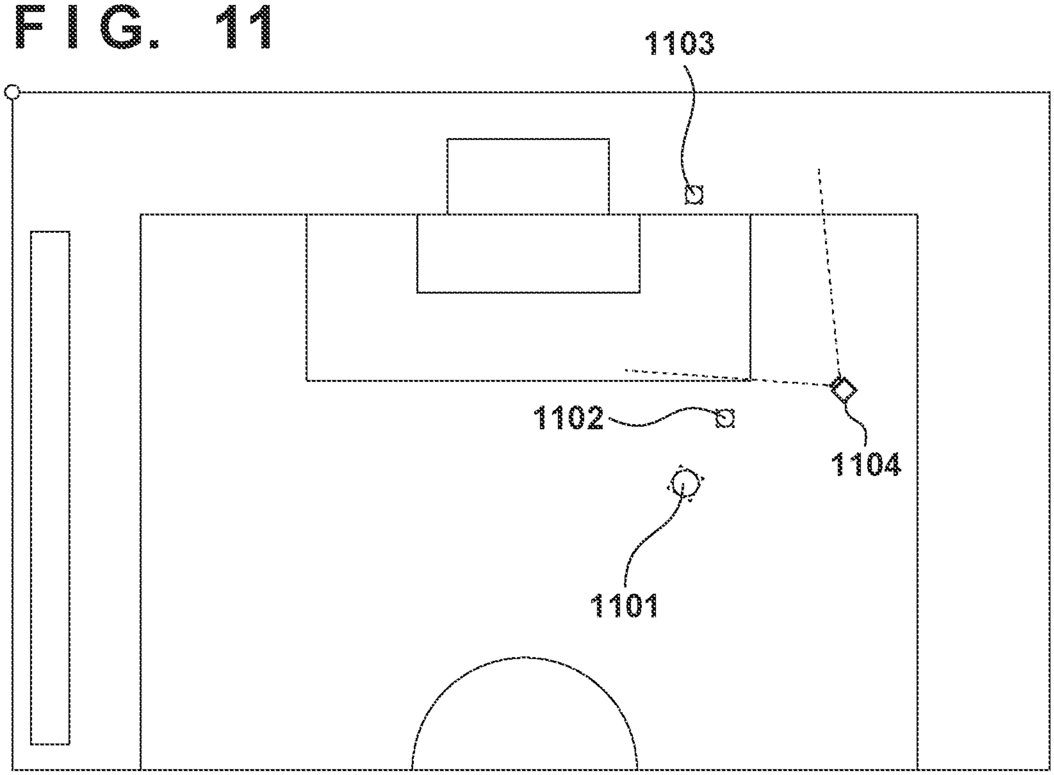
FIG. 11 is a diagram illustrating an example of three-dimensional space and the distribution of subjects corresponding to content being displayed according to a fourth modification of the present disclosure.

For example, take the example illustrated in FIG. 11 in which subjects (player 1101, ball 1102, and drink bottle 1103) identified as target objects and a virtual viewpoint 1104 relating to the main video being displayed are distributed in a three-dimensional space relating to the content being viewed. Here the coordinates (X, Y, Z) are as follows.

Player 1101: (48000, 16000, 0)

Ball 1102: (50000, 15000, 0)

Drink bottle 1103: (49000, 4500, 1000)

Virtual viewpoint 1104: (53500, 11500, 1000)

At this time, one target object may be selected as the one closest to the virtual viewpoint 1104 relating to the main video being displayed. In other words, in the example in FIG. 11, the ball 1102, which has the shortest linear distance to the virtual viewpoint 1104, is selected as one target object to display an advertisement video of. Accordingly, the CPU 301 generates the introduction camera path information on the basis of the reference camera path information relating to the ball 1102.

Also, one target object may be selected as the one included in the field of view (field angle) of the virtual viewpoint 1104 relating to the main video being displayed. In other words, in the example in FIG. 11, the drink bottle 1103, which is included in the field of view of the virtual viewpoint 1104, is selected as one target object to display an advertisement video of. Accordingly, the CPU 301 generates the introduction camera path information on the basis of the reference camera path information relating to the drink bottle 1103.

Figure 12:
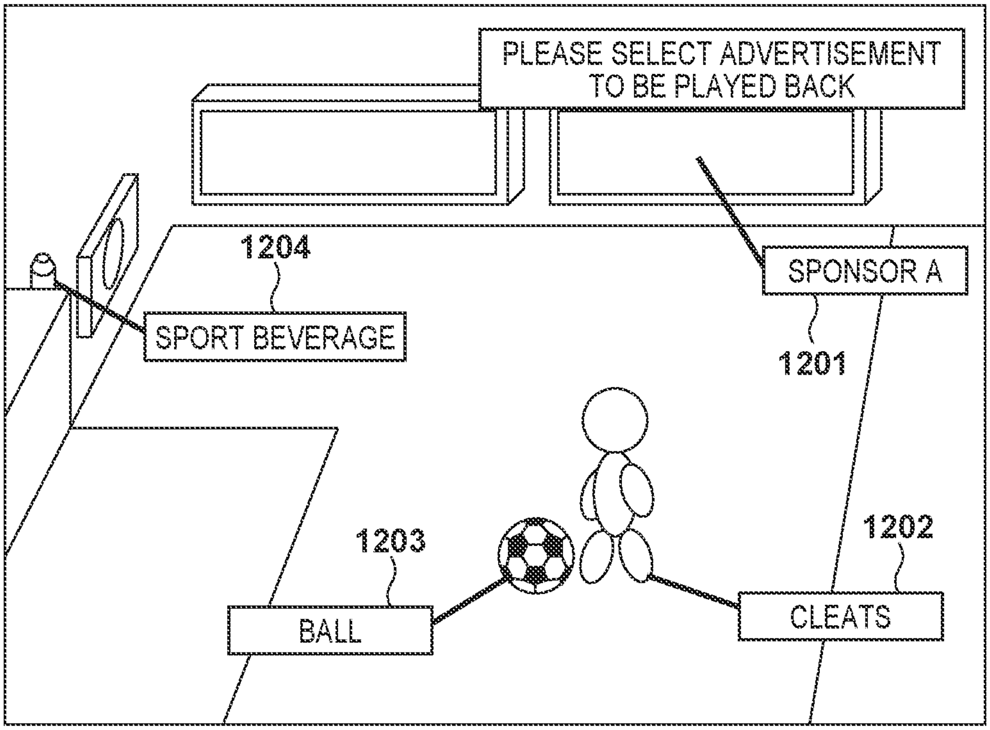
FIG. 12 is a diagram illustrating an example of a target object selection screen displayed on the image processing apparatus 100 according to the fourth modification of the present disclosure.

Note that in the example in FIG. 11, only the drink bottle 1103 is identified. However, a plurality of target objects may be included in the field of view of the virtual viewpoint 1104 relating to the main video being displayed. In this case, for example, the target object closest to the center of the field of view may be selected as the one target object. Alternatively, as illustrated in FIG. 12, the CPU 301 may display the main video superimposed with information (labels 1201 to 1204) for discerning the type of the plurality of target objects in the field of view and make the viewer select the target object to view an advertisement video of. In this case, the CPU 301 selects one target object on the basis of an operation input relating to selection of the type of target object and generates the introduction camera path information.

Also, to increase the advertisement effect, onscreen text (the labels 1201 to 1204) may further display the sponsor name or sponsor logo.

Fifth Modification

In the embodiments and modifications described above, the display of the display apparatus 310 switches to the advertisement video after the introduction video is displayed. However, the present disclosure is not limited thereto. In other words, it is sufficient that the introduction video is displayed before the advertisement video is displayed, and the display apparatus 310 does not necessarily have to only display the advertisement video. For example, after the introduction video is displayed, the main video may be displayed again, with the advertisement video being displayed superimposed on the main video.

Sixth Modification

In the embodiments and the modifications described above, the present disclosure is applied to the image processing apparatus 100 that generates a virtual viewpoint video. However, the present disclosure is not limited thereto. It is sufficient that the present disclosure can be applied to an apparatus that can control the display content of an image processing apparatus. For example, the present disclosure can also be applied to an external apparatus that delivers information of the virtual viewpoint for displaying the virtual viewpoint video and a display command such as an advertisement display instruction to the image processing apparatus 100.

Also, the virtual viewpoint video is not necessarily generated in the image processing apparatus 100 and may be distributed to the image processing apparatus 100 in a streaming format, for example. In this case, the present disclosure can be applied to an apparatus that is the distribution source of the virtual viewpoint video or another apparatus that supplies the information of the virtual viewpoint to this apparatus.

Seventh Modification

In the embodiments and the modifications described above, when the advertisement video is displayed during the display of the main video, an introduction video is generated and displayed. However, the present disclosure is not limited thereto. The video displayed after the introduction video is displayed does not necessarily have to be a video for the purpose of advertisement and may be a discretionary video prepared in advance. In this case, a target object relating to the video in the three-dimensional space relating to the content being viewed is identified, and the introduction camera path information is generated on the basis of the position of the target object.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-060795, filed Mar. 31, 2022, and 2022-182797, filed Nov. 15, 2022 which are hereby incorporated by reference herein in their entirety.

What is claimed is:

1. An image processing apparatus comprising:

one or more memories storing instructions; and one or more processors executing the instructions to:

display a virtual viewpoint video generated using a plurality of video data generated by a plurality of image capture apparatuses and first video data that is stored in a storage medium and different from the plurality of video data, wherein the first video data stored in the storage medium comprises a plurality of images about an object;

identify, in the plurality of video data, the object relating to the first video data and a position of the object;

generate second video data which is the virtual viewpoint video following movement of a virtual viewpoint from a first virtual viewpoint corresponding to the virtual viewpoint video being displayed to a second virtual viewpoint determined on a basis of the identified position of the object; and control to display the first video data after displaying the second video data, wherein the second virtual viewpoint is determined on a basis of display content of an opening portion of the first video data.

2. The image processing apparatus according to claim 1, wherein the one or more processors further executes the instructions to determine a camera path for moving the virtual viewpoint from the first virtual viewpoint to the second virtual viewpoint having a predetermined relative positional relationship with the identified position of the object, and the second video data is the virtual viewpoint video following the movement along the camera path.

3. The image processing apparatus according to claim 1, wherein the movement includes predetermined viewpoint movement for the object.

4. The image processing apparatus according to claim 1, wherein the movement includes movement of the virtual viewpoint toward the object.

5. The image processing apparatus according to claim 1, wherein the second virtual viewpoint is determined so that display of the object in the opening portion of the first video data matches display of the object in an end portion of the second video data.

6. The image processing apparatus according to claim 1, wherein the movement is defined so that the object is shown in a field of view within a predetermined distance from the object for a predetermined frame period.

7. The image processing apparatus according to claim 1, wherein the one or more processors further executes the instructions to:

identify an orientation of the object; and generate the second video data on a basis of the position and the orientation of the object.

8. The image processing apparatus according to claim 1, wherein the first video data stored in the storage medium includes a plurality of types, the one or more processors further executes the instructions to:

identify positions of a plurality of types of the objects corresponding to the plurality of types of first video data;

select one object from the plurality of types of objects with positions identified; and generate the second video data for the one object selected.

9. The image processing apparatus according to claim 8, wherein the one object is selected on a basis of a position of the first virtual viewpoint corresponding to the virtual viewpoint video being displayed.

10. The image processing apparatus according to claim 9, wherein the object closest to the first virtual viewpoint corresponding to the virtual viewpoint video being displayed is selected as the one object.

11. The image processing apparatus according to claim 8, wherein the one or more processors executes the instructions to:

control to attach information for discerning types of the plurality of types of objects with positions identified and display the information; and select the one object on a basis of an operation input to select a type of the object performed via the image processing apparatus.

12. The image processing apparatus according to claim 1, wherein the first video data is an advertisement video, and the one or more processors executes the instructions to identify a position of the object corresponding to an advertisement target of the advertisement video.

13. A control method for an image processing apparatus comprising:

displaying a virtual viewpoint video generated using a plurality of video data generated by a plurality of image capture apparatuses and first video data that is stored in a storage medium and different from the plurality of video data, wherein the first video data stored in the storage medium comprises a plurality of images about an object;

identifying, in the plurality of video data, the object relating to the first video data and a position of the object;

generating second video data which is the virtual viewpoint video following movement of a virtual viewpoint from a first virtual viewpoint corresponding to the virtual viewpoint video being displayed to a second virtual viewpoint determined on a basis of the identified position of the object; and controlling to display the first video data after displaying the second video data, wherein the second virtual viewpoint is determined on a basis of display content of an opening portion of the first video data.

14. A non-transitory computer-readable storage medium storing a program configured to cause a computer to function as the control method according to claim 13.

* * * * *